United States Patent
Hoover et al.

(10) Patent No.: US 11,915,290 B2
(45) Date of Patent: Feb. 27, 2024

(54) SYSTEMS AND METHODS FOR DETERMINING AND LEVERAGING GEOGRAPHY-DEPENDENT RELATIVE DESIRABILITY OF PRODUCTS

(71) Applicant: Capital One Services, LLC, McLean, VA (US)

(72) Inventors: Jason Hoover, Grapevine, TX (US); Avid Ghamsari, Frisco, TX (US); Qiaochu Tang, The Colony, TX (US); Geoffrey Dagley, McKinney, TX (US); Micah Price, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 35 days.

(21) Appl. No.: 16/853,126

(22) Filed: Apr. 20, 2020

(65) Prior Publication Data

US 2021/0326957 A1   Oct. 21, 2021

(51) Int. Cl.
G06Q 30/00      (2023.01)
G06Q 30/0601    (2023.01)
G06Q 30/0204    (2023.01)

(52) U.S. Cl.
CPC ..... *G06Q 30/0627* (2013.01); *G06Q 30/0205* (2013.01); *G06Q 30/0639* (2013.01)

(58) Field of Classification Search
CPC .......... G06Q 30/0627; G06Q 30/0205; G06Q 30/0639
See application file for complete search history.

(56) References Cited

U.S. PATENT DOCUMENTS 7,865,409 B1    1/2011 Monaghan
8,392,334 B2    3/2013 Hirtenstein et al.
8,589,212 B2 *  11/2013 Pollak ................. G06Q 10/087
                                                  705/7.35

(Continued)

FOREIGN PATENT DOCUMENTS

WO          01/93133 A1    12/2001

OTHER PUBLICATIONS

"Predict Consumers' Automobile Purchase Behavior Based on the Preferences of Explicit Features and Implicit Topic," by Du Yanan and Qian Yang, 2019 J. Phys.: Conf. Ser. 1237 022104 (Year: 2019).*

*Primary Examiner* — Anne M Georgalas
(74) *Attorney, Agent, or Firm* — Bookoff McAndrews, PLLC

(57) ABSTRACT

According to certain aspects of the disclosure, a computer-implemented method may be used for regulating vehicle stock. The method may include receiving one or more queries indicative of one or more characteristics of a vehicle for purchase by a user and determining based on the one or more queries indicative of the one or more characteristics of the vehicle, at least one vehicle available for purchase at a location of a merchant. The method may also include determining a quantity of the at least one vehicle purchased and assigning a value to the at least one vehicle based on the quantity of the at least one vehicle purchased and a quantity of received queries about the vehicle. The method may also include transmitting the value to the user, with a recommendation regarding the at least one vehicle available for purchase based on the value.

20 Claims, 6 Drawing Sheets

(56) References Cited

U.S. PATENT DOCUMENTS

| | | | |
|---|---|---|---|
| 8,589,250 B2* | 11/2013 | Noy | G06Q 30/0282 |
| | | | 705/26.4 |
| 10,255,300 B1* | 4/2019 | Jhingran | G06F 16/21 |
| 10,878,435 B2* | 12/2020 | O'Keeffe | G06Q 30/0601 |
| 10,937,089 B2* | 3/2021 | Nandan | G06N 20/00 |
| 11,361,335 B2* | 6/2022 | Malik | G06Q 30/0278 |
| 11,443,332 B2* | 9/2022 | Battista | G06Q 30/0202 |
| 11,537,876 B2* | 12/2022 | Bivens | G06N 3/042 |
| 11,551,279 B2* | 1/2023 | Denthumdas | G06Q 30/0627 |
| 2006/0041443 A1* | 2/2006 | Horvath, Jr. | G06Q 30/06 |
| | | | 358/1.18 |
| 2008/0195435 A1* | 8/2008 | Bentley | G06Q 30/0603 |
| | | | 705/7.33 |
| 2015/0310466 A1 | 10/2015 | LaCivita et al. | |
| 2017/0270580 A1* | 9/2017 | Esposito | G06Q 30/0613 |
| 2020/0394698 A1* | 12/2020 | Schoeny | G06Q 30/0629 |

* cited by examiner

SYSTEMS AND METHODS FOR DETERMINING AND LEVERAGING GEOGRAPHY-DEPENDENT RELATIVE DESIRABILITY OF PRODUCTS

TECHNICAL FIELD

Various embodiments of the present disclosure relate generally to providing purchase recommendations to purchasers of products based on the history of the purchasers. More specifically, embodiments of the present disclosure relate to artificial intelligence-based purchase recommendations.

BACKGROUND

Purchasers of relatively expensive items, such as cars, real estate, mattresses, boats, computers, etc. may conduct part or all of their shopping for such items online, via the internet. In researching and completing such a purchase, a consumer may visit multiple websites in search of appropriate information. For example, consumers may view inventory information or perform other research regarding a purchase on multiple websites. However, while different websites may recommend one or more items based on recommendation models the websites are trained on, the resulting recommendation may be ineffective if the recommended item is not financially accessible to the purchaser.

Furthermore, in areas of commerce such as those described above, the purchaser is at a disadvantage because the purchaser is not privileged to the large amount of transaction information that may be available to merchants to determine advantageous transaction terms. Thus, consumers may make sub-optimal purchase decisions due to a lack of accessible and/or digestible information.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for determining one or more recommendations. Each of the examples disclosed herein may include one or more of the features described in connection with any of the other disclosed examples.

In one example, a computer-implemented method may be used for regulating vehicle stock. The method may include receiving, by one or more processors, one or more queries indicative of one or more characteristics of a vehicle for purchase by a user; determining, by the one or more processors, based on the one or more queries indicative of the one or more characteristics of the vehicle, at least one vehicle available for purchase at a location of a merchant; determining, by the one or more processors, a quantity of the at least one vehicle purchased; assigning, by the one or more processors, a value to the at least one vehicle based on the quantity of the at least one vehicle purchased and a quantity of the received one or more queries indicative of the one or more characteristics of the vehicle for purchase; transmitting, by the one or more processors, the value to the user; and transmitting to the user, by the one or more processors, a recommendation to the at least one vehicle available for purchase based on the value.

According to still another aspect of the disclosure, a computer system for regulating vehicle stock may include a memory having processor-readable instructions stored therein and a processor configured to access the memory and execute the processor-readable instructions to perform a plurality of functions. The functions may include receiving, by one or more processors, one or more queries indicative of one or more characteristics of a vehicle for purchase by a user; determining, by the one or more processors based on the one or more queries indicative of one or more characteristics of the vehicle, at least one vehicle available for purchase at a location of a merchant; determining, by the one or more processors, a quantity of the at least one vehicle purchased; assigning, by the one or more processors, a value to the at least one vehicle based on the quantity of the at least one vehicle purchased and a quantity of the received one or more queries indicative of the one or more characteristics of the vehicle for purchase; transmitting, by the one or more processors, the value to the user; and transmitting to the user, by the one or more processors, a recommendation to the at least one vehicle available for purchase based on the value.

According to another aspect of the disclosure, a computer-implemented method may be used for regulating vehicle stock. The method may comprise training, by one or more processors, at least one machine learning algorithm by analyzing training data related to quantities of vehicle purchased and a number of queries submitted for vehicles; receiving, by one or more processors, one or more queries indicative of one or more characteristics of a vehicle for purchase by a user; determining, by the one or more processors based on the one or more queries of the vehicle, at least one vehicle available for purchase at a location of a merchant; determining, by the one or more processors, a quantity of the at least one vehicle purchased; determining, by the one or more processors using the at least one trained machine learning algorithm, a value to the at least one vehicle based on the quantity of the at least one vehicle purchased and a quantity of the received query indicative of one or more characteristics of the vehicle; monitoring, by the one or more processors, the availability of vehicles assigned a value exceeding a threshold value and the availability of vehicles assigned a value below a threshold value at the location of the merchant; determining, by the one or more processors, a likelihood value for purchasing by the user of an available vehicle assigned the value exceeding the threshold value; and transmitting to the user, by the one or more processors, a recommendation based on the likelihood value, an available vehicle assigned the value below the threshold value.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
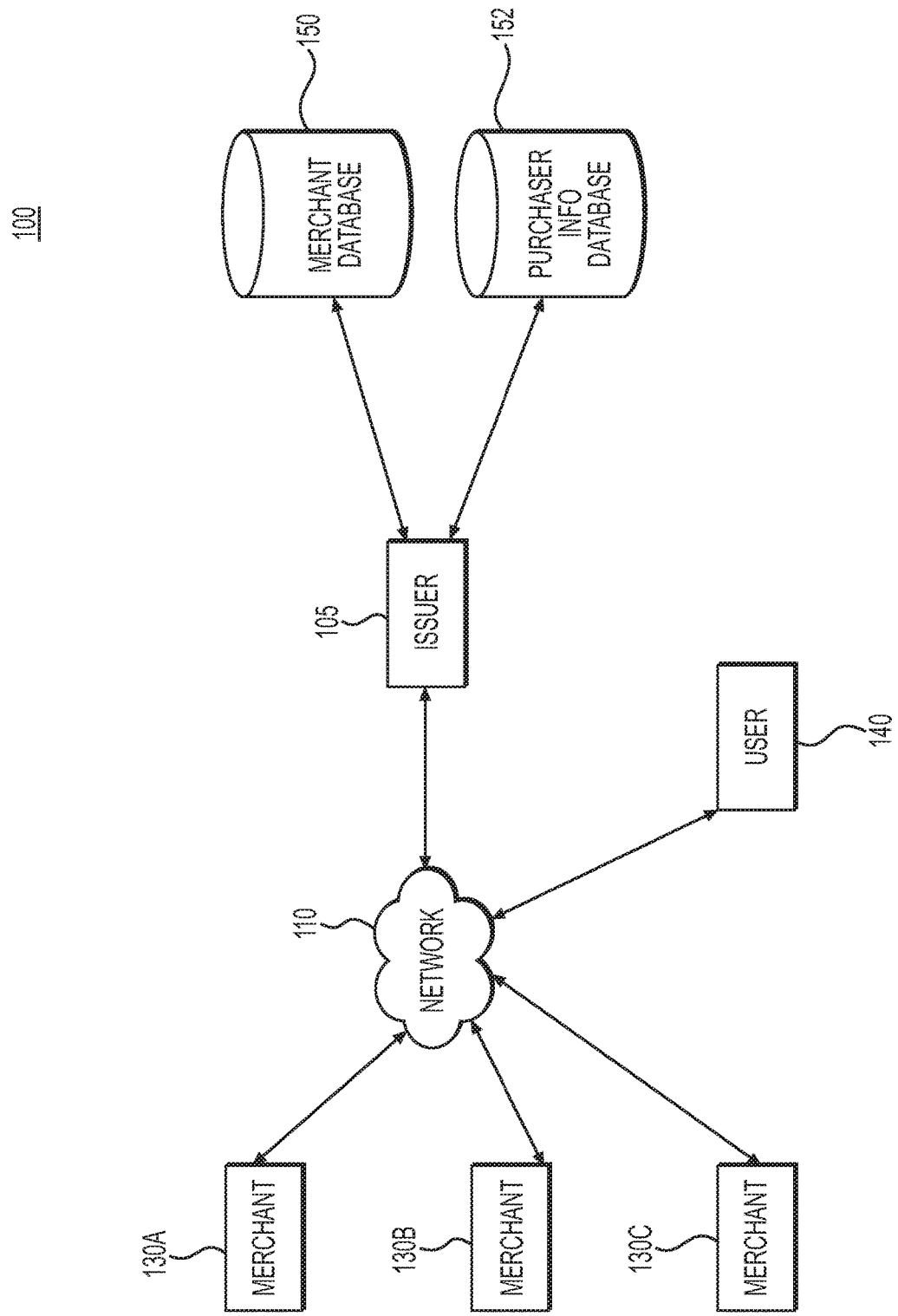
FIG. 1 depicts an exemplary environment in which systems, methods and other aspects of the present disclosure may be implemented.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides methods and systems for providing purchasers and merchants with the most advantageous transaction terms, for example, providing assistance to a purchaser with finding and acquiring a vehicle that the purchaser may be interested in, and/or assisting merchants with inventory balancing and management. While automotive vehicles are referenced herein as an exemplary application for the systems and methods described herein, it will be understood that this disclosure is not limited to automotive vehicles and may apply to other contexts, such as real estate, technology, boats, mattresses, and/or other items. The systems and methods described herein may be used in order to present information to purchasers. For example, the disclosed systems and methods may be used to present recommendations regarding a vehicle to a purchaser. The disclosed systems and methods also may learn purchasers' preferences over time and may deliver recommendations to purchaser in accordance with those preferences. The systems and methods disclosed herein may base these recommendations at least in part on information gathered regarding the vehicle-purchasing preferences of a population. For example, an application (running on a device, such as a user device) according to the disclosure may provide purchasers with a desirability rating of a vehicle and may assist the purchaser with selecting a vehicle most beneficial to the purchaser. The application according to the disclosure may also provide merchants with the desirability value of the vehicles and assist the merchants to balance demand and supply to maximize or improve inventory efficiency and/or other benefits. While the disclosure includes descriptions of exemplary methods, it will be understood that the steps of each method may be placed in various combinations or permutations and/or may be mixed and matched. For example, a step from one exemplary method may be used in conjunction with steps of another exemplary method. Additionally, steps may be added, deleted, or repeated within exemplary methods disclosed herein.

Referring now to the appended drawings, FIG. 1 depicts an exemplary environment 100 in which systems, methods and other aspects of the present disclosure may be implemented. The exemplary system environment 100 may include an issuer 105, a network 110, a plurality of merchants 130A-130C, one or more user devices 140, a merchant database 150, a purchaser transaction database 151, and a purchaser information database 152. The issuer 105 is connected to the merchants 130A-130C and the purchaser 140 via network 110. The network 105 may be any suitable network or combination of networks and may support any appropriate protocol suitable for communication of data between various components in the system environment 100. The network may include a public network (e.g., the internet), a private network (e.g., a network within an organization), or a combination of public and/or private networks.

The one or more user devices 140 may be operated by one or more users for communication and deal simulation. Examples of user devices may include smartphones, wearable computing devices, tablet computers, laptops, and desktop computers. The one or more user devices 140 may have the ability to track information such as a user location, an application that the user is using, browser windows the user may be viewing, browser history, etc. The one or more user devices 140 may, with permission from a user, transmit some or all of such information to a processor belonging to the issuer 105 and/or the merchants 130A-130C.

Each of the plurality of merchants 130A-130C may be an entity that provides products. In this disclosure, the term "product," in the context of products offered by a merchant, encompasses both goods and services, as well as products that are a combination of goods and services. Each merchant 130A-130C may be, for example, a vehicle manufacture, a vehicle dealer, a retailer, or other type of entity that provides products that a user may purchase.

The issuer 105 may be an entity such as a bank, credit card issuer, merchant services provider, or other type of financial service entity. In some examples, the issuer 105 may include one or more merchant services providers that provide the merchants 130A-130C with the ability to accept electronic payments, such as payments using credit cards and debit cards. In other examples, the issuer 105 may include one or more merchant services providers that provide the merchants 130A-130C with the ability to process financial loans, such as vehicle loans. Therefore, the issuer 105 may collect and store transaction data pertaining to consumer transactions occurring at the merchants 130A-130C.

The merchant database 150 may include previous transaction data between the merchants and the purchasers. Previous transaction data may include, e.g., transactions that are both successful and unsuccessful. Successful transactions may be transactions that result in a purchaser completing a purchase or lease. Unsuccessful transactions may be transactions that, e.g., are initiated, but that do not result in a purchaser completing a purchase or lease. Both successful and unsuccessful transaction data may include, for example, merchant identification information, and information identifying or otherwise describing a product for purchase. In the context of a vehicle, such information may include, e.g., the make of the vehicle, the model of the vehicle, the color of the vehicle, warranty, tax rate, add-ons, surcharges, interest rate, total cost of the vehicle, gap insurance, trade-ins, service agreements, number of negation rounds to arrive at the final price, and any other information acquired as part of the transaction.

The purchaser information database 152 may store information regarding the purchaser, such as name, phone number, spending history, account balance, geographic location data, available credit, credit to debt ratio, credit history, credit segmentation, bankruptcy history, income amount, spending habits, age group, and demographic information.

Each of the merchant database 150 and the purchaser information database 152 may be physically located, e.g., at a facility belonging to the issuer 105, may be located remotely, or may be located in the "cloud" (e.g., may include multiple processors, servers, devices, etc.).

Figure 2:
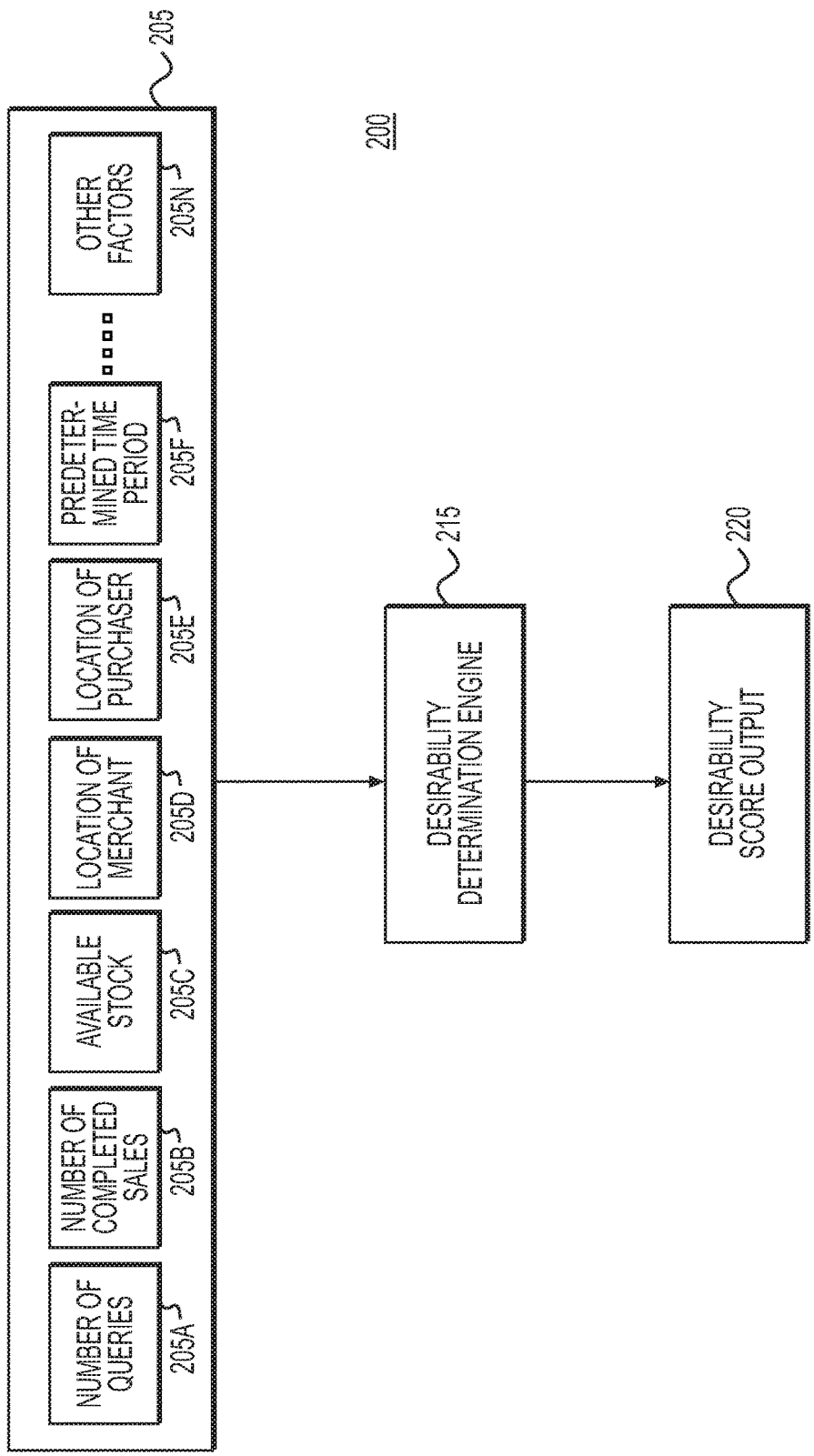
FIG. 2 depicts an exemplary diagram of a system/method for determining a desirability score, according to one or more embodiments.

FIG. 2 depicts an exemplary flow diagram for a process 200 of determining a desirability score, according to one or more embodiments. The process 200 may include desirability factors 205, a desirability determination engine 215, and desirability score output 220. The desirability factors 205 may include one or more factors that may influence the desirability score for a product. The desirability score may reflect a degree to which a product is estimated to be desirable to a purchaser (or lessee). For example, in the context of vehicles for purchase, the desirability factors may include the total number of queries submitted for a particular vehicle (205A), the number of completed sales of a particular vehicle (205B), the available stock of a particular vehicle (205C), the location of a merchant with available stock of the vehicle (205D), the location of the purchaser (205E), a predetermined time period (205F), and/or other relevant factors (205N) that would affect an overall desirability of a vehicle. In another embodiment, the desirability factors could also be the set of historical data on the desirability factors. For example, the number of queries submitted for a particular vehicle every day for the previous 30 days.

The desirability determination engine 215 may be located, e.g., at the issuer 105 of the environment 100, or may be located remotely from the issuer 105 but connected to the issuer 105 via the network 110. The desirability determination engine 215 may receive the one or more desirability factors 205 and output the computed desirability score via the desirability score output 220. The desirability determination module 215 may utilize, e.g., one or more trained machine learning algorithms. A trained machine learning algorithm may include, e.g., a regression-based model that accepts the one or more desirability factors 205. The one or more trained machine learning algorithms may be of any suitable form, and may include, for example, a neural network. A neural network may be software representing a neural system (e.g., cognitive system). A neural network may include a series of layers termed "neurons" or "nodes." A neural network may comprise an input layer to which data is presented, one or more internal layers, and an output layer. The number of neurons in each layer may be related to the complexity of a problem to be solved. Input neurons may receive data being presented and then transmit the data to the first internal layer through the connections' weight. The one or more trained machine learning algorithms may include a convolutional neural network (CNN), a deep neural network, or a recurrent neural network (RNN).

A CNN may be a deep and feed-forward artificial neural network. A CNN may be applicable to analyzing factors, such as the one or more desirability factors, or a score, such as a desirability score, described elsewhere herein. A CNN may include an input layer, an output layer, and multiple hidden layers. Hidden layers of a CNN may include convolutional layers, pooling layers, or normalization layers. Layers may be organized in three virtual dimensions: width, height, and depth. In some embodiments, the total number of convolutional layers may be at least about 3, 4, 5, 10, 15, 20 or more. In some embodiments, the total number of convolutional layers may be at most about 20, 15, 10, 5, 4, or less.

Convolutional layers may apply a convolution operation to an input, and pass results of a convolution operation to a next layer (known as a "forward pass"). For processing factors (such as desirability factors), a convolution operation may reduce the number of free parameters, allowing a network to be deeper with fewer parameters. A free parameter may be a variable which cannot be predicted precisely or constrained by the model and must be estimated experimentally or theoretically. In the context of the current disclosure, free parameters may include, e.g., the number of queries submitted for a vehicle, or other factors. A "deeper" network may result in more accurate output from the network, as the number of calculations may increase as the network gets deeper. In a convolutional layer, neurons may receive input from only a restricted subarea of a previous layer. A convolutional layer's parameters may comprise a set of learnable filters (or "kernels"). Learnable filters may have a small receptive field and extend through the full depth of an input volume. During a forward pass, each filter may be convolved across the width and height of an input volume, compute a dot product between entries of a filter and an input, and produce a 2-dimensional activation map of that filter. As a result, a network may learn filters that activate when detecting some specific type of feature at some spatial position as an input.

An RNN may be configured to receive sequential data (e.g., numbers of search queries, and/or numbers of vehicle sold) as one or more inputs, such as consecutive data inputs. The RNN may update an internal state at a periodic time step. An RNN can be applicable to tasks such as, e.g., processing search queries to determine an identity of a vehicle requested by a search query, or processing computation with regards to historical information. The RNN may include a fully recurrent neural network, an independently recurrent neural network, Jordan networks, an echo state network, a neural history compressor, a gated recurrent unit, a multiple timescales model, a differentiable neural computer, any other type of RNN, or any combination thereof.

The trained machine learning algorithm may compute the vehicle desirability score as a function of the one or more desirability factors 205. This function may be learned by training the machine learning algorithm with training sets of variables derived from the one or more desirability factors 205.

The machine learning algorithm may be trained by supervised, unsupervised, or semi-supervised learning using training sets comprising data of types similar to the type of data used as the input for process 200. For example, the training set used to train the model may include any combination of the following: the total number of queries submitted for a particular vehicle (205A), the number of completed sales of a particular vehicle (205B), the available stock of a particular vehicle (205C), the location of the merchant (205D), the location of the purchaser (205E), a predetermined time period (205F), and/or other relevant factors (205N). Additionally, the training set used to train the algorithm may further include user data, including, but not limited to, demographic information of the purchaser or other data related to the purchaser. Accordingly, the machine learning algorithm may be trained to map input variables to, e.g., a desirability of each specific vehicle based on a number of the specific vehicle purchased and the number of search queries for the specific vehicle. That is, the machine learning algorithm may be trained to determine a vehicle desirability as a function of various input variables.

Figure 3:
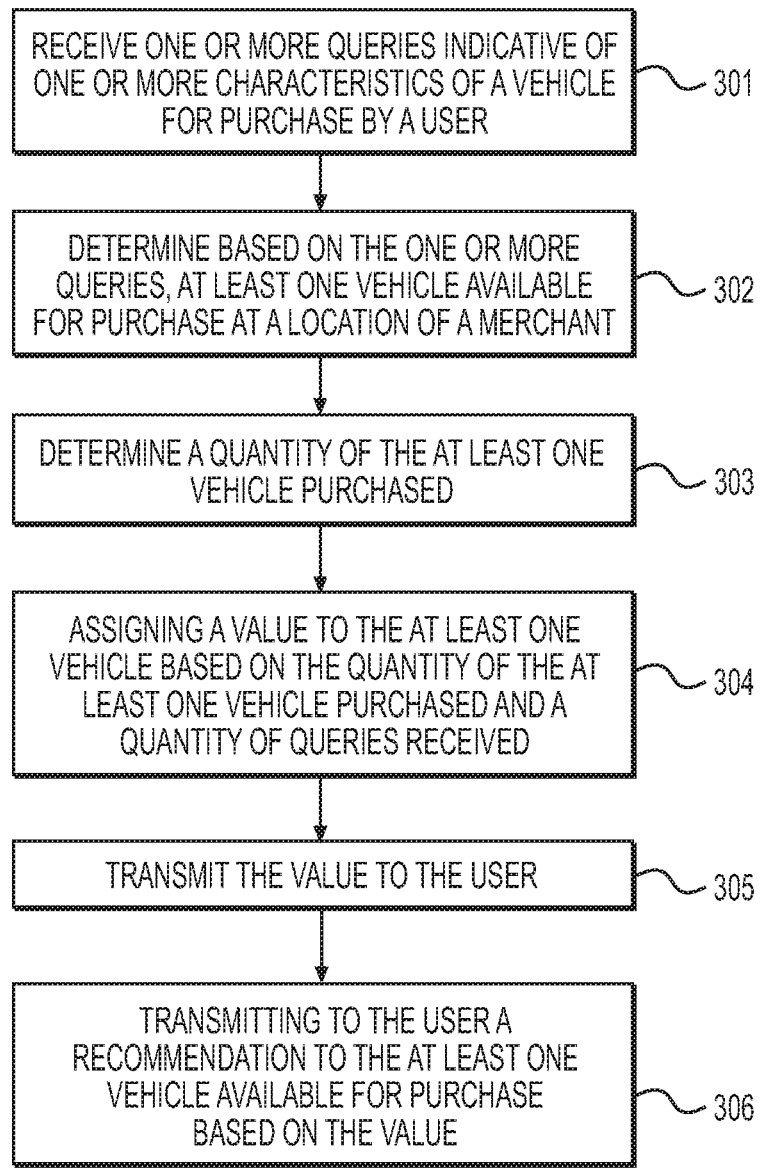
FIGS. 3-4 depict exemplary flow charts for vehicle recommendation based on desirability value, according to one or more embodiments.

FIG. 3 depicts an exemplary flow chart of a method 300 for vehicle recommendation based on desirability score, according to one or more embodiments. The method 300 may begin with step 301 where a query indicative of one or more characteristics of a vehicle for purchase by a user is received via the user device 140. The query may be submitted on a search engine, or may be submitted to the issuer 105. In addition to the query submitted by the user via the user device 140, queries submitted by other users may also be recorded and/or tracked. The issuer 105 may keep a tally of the number of queries received for one or more characteristics of a vehicle or for any specific make and/or model of vehicles. Furthermore, the issuer 105 may communicate (e.g. call a API) with analytic tools provided by search engines to determine a quantity of queries received for one or more characteristics of a vehicle or for any specific make and/or model of vehicles. The one or more characteristics of a vehicle may include a year, make, model, color, type, transmission, door count, condition, etc. of a vehicle that the user may be interested in.

At step 302 a search is performed to determine at least one vehicle available for purchase at a location of a merchant that match with the one or more vehicle characteristics searched for by the user. For example, the at least one vehicle available for purchase may be based on characteristics that may include any one or more of a year of the vehicle, a make of the vehicle, a model of the vehicle, a vehicle trim, a fuel economy of a vehicle, a safety rating of a vehicle, etc. The location may be determined by a location entered by the user (e.g., zip code or address), or may be determined via the user device 140 operated by the user. For example, the user device 140 may be equipped with a GPS module or cellular hardware, and the location of the user device 140 may be determined via the GPS module or triangulation of communication between the user device 140 and cellular towers. At step 303, a determination is made on the quantity of the at least one vehicle purchased. For example, based on the one or more characteristics submitted by the user, it may be determined that the Honda Accord meets the one or more characteristics and is available for purchase at a location of a merchant. Then a determination is made to calculate the quantity of Honda Accords purchased. The determination may be for a geographic area of the user (e.g., city or state) and may be for a predetermined time period. (e.g., the previous 3 month or the previous year). The user 140 and/or issuer 105 may select to use either or both geographic area and/or the predetermined time period. Furthermore, the quantity of the at least one vehicle purchased may also be determined by the number of loan instruments received by the issuer 105. For example, the number of successful or approved loan instruments received by the issuer 105 from merchants may indicate successful sales of the vehicles. Therefore, the total number of approved loan instruments may also be used to determine the quantity of the at least one vehicle purchased. In addition, the quantity of the at least one vehicle purchased may also be determined by monitoring the inventory of the merchants. For example, the removal of a vehicle with a specific vehicle identification number (VIN) from the inventory of the merchant may be determined as the vehicle being sold to a purchaser, as long as the specific VIN does not reappear at another merchant's inventory.

At step 304 a value may be assigned to the at least one vehicle based on the quantity of the at least one vehicle purchased and a quantity of queries received. The value may be a numerical value from 0-100, or any other descriptor that may represent the desirability or demand of the vehicle (e.g., a desirability score). For example, if the Honda Accord was sold more than any other vehicle, and if a high number of search queries directed to it were observed, then the Honda Accord may be assigned a value of 90 to represent a high desirability. The data regarding the number of Honda Accords sold and the number of search queries directed to it may be collected from, e.g., the merchant database 150, the issuer 105, and/or third party search engines. At step 305, the at least one vehicle available for purchase and the associated desirability value may be transmitted to the user. The information may be transmitted to the user via a website or an application having a user interface on the user device 140.

At step 306, a recommendation of the at least one vehicle available for purchase based on the desirability value may be transmitted to the user. The recommendation may be transmitted to the user via a website or via an application having a user interface (e.g., notification) on the user device 140.

The recommendation may be of a vehicle with any desirability value, ranging from a high desirability value or to a relatively low desirability value. A user may be recommended a vehicle with a relatively higher or lower desirability value based on the preference(s) of the user and/or the financial status of the user. For example, a user with excellent credit or in excellent financial shape (e.g., in relatively low debt or having a high preapproved loan amount) may be recommended a vehicle with a relatively high desirability value to purchase. Alternatively, a user with poorer financial status may be recommended a vehicle with a lower desirability value, because vehicles with low desirability value may be unpopular and more difficult for a merchant to sell. Therefore, the user may be able to negotiate a price that fits with the financial status of the user, and/or that is otherwise to the benefit of the user.

Figure 4:
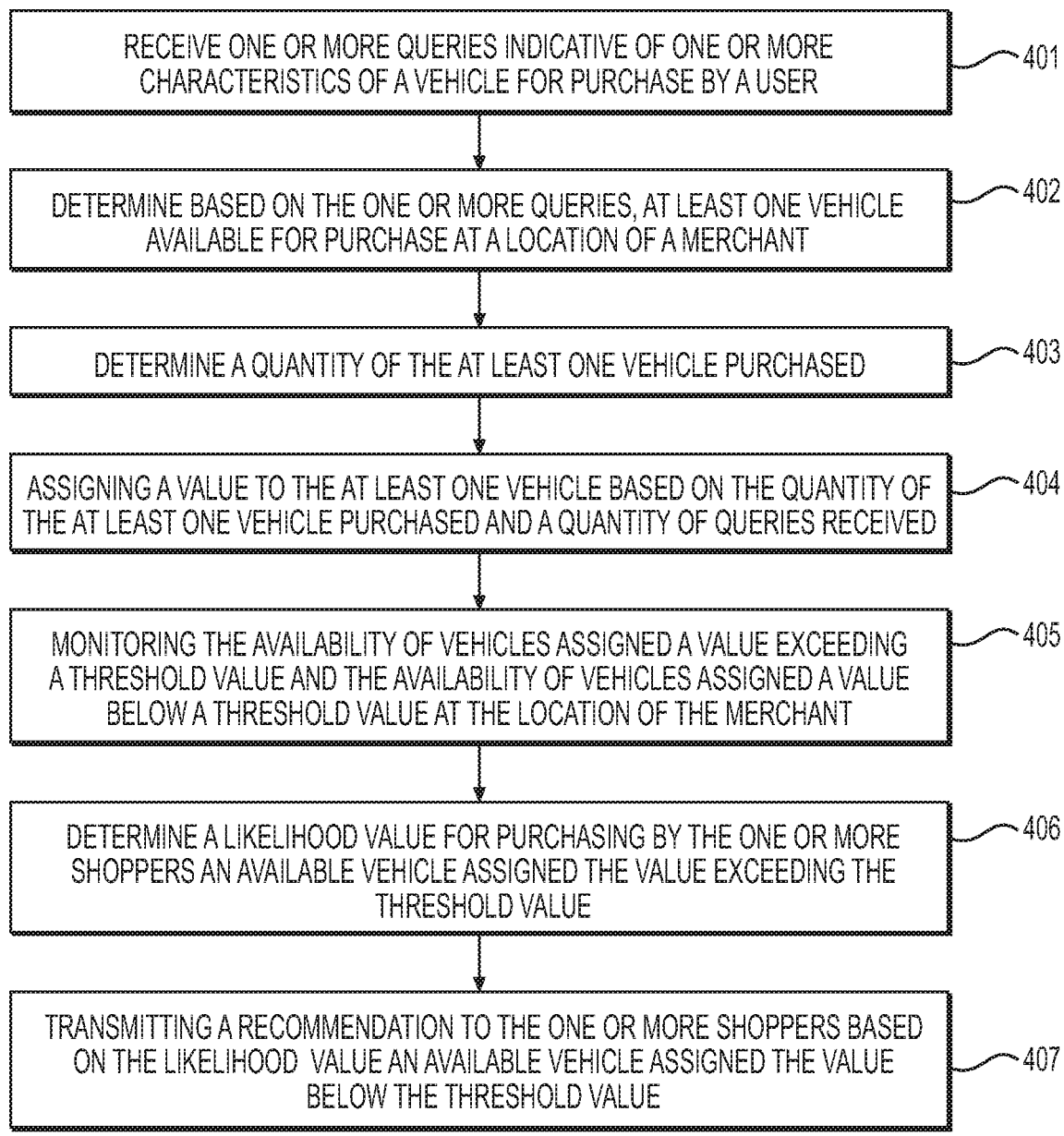

FIG. 4 depicts an exemplary flow chart of method 400 for vehicle recommendation based on desirability score, according to one or more embodiments. The method 400 may begin with step 401 where a query indicative of one or more characteristics of a vehicle for purchase by a shopper is received from the user, e.g., via the user device 140. The query may be submitted on a search engine, or may be submitted to the issuer 105. In addition to the query submitted by the shopper via the user device 140, queries submitted by other users may also be recorded and/or tracked. The issuer 105 may keep a tally of the number of queries received for one or more characteristics of a vehicle or for any specific make and/or model of vehicles. In some embodiments, such a tally of queries may be stored in, e.g., the purchaser information database 152. Furthermore, the issuer 105 may communicate (e.g. call an API) with analytic tools provided by search engines to determine a quantity of queries received for one or more characteristics of a vehicle or for any specific make and/or model of vehicles. The one or more characteristics of a vehicle may include a year, make, model, color, type, transmission, door count, condition, etc. of a vehicle that the shopper may be interested in.

At step 402, a search is performed to determine at least one vehicle available for purchase at a location of a merchant that match with part or all of the one or more vehicle characteristics searched for by the shopper. The location may be determined by a location entered by the user (e.g., zip code or address), or may be determined via the user device 140 operated by the shopper. For example, the user device 140 may be equipped with a GPS module or cellular hardware, and the location of the user device 140 may be determined via the GPS module or triangulation of communication between the user device 140 and cellular towers.

At step 403, a determination is made as to the quantity of the at least one vehicle purchased. For example, based on the one or more characteristics submitted by the shopper, it may be determined that the Honda Accord meets the one or more characteristics and is available for purchase at a location of a merchant. Then a determination is made to calculate the quantity of Honda Accords purchased. The determination may be for a geographic area of the shopper (e.g., city and/or state) and may be for a predetermined time period. (e.g., the previous 3 months, the previous year, or any other time window specified by a start date and/or stop date). The shopper and/or issuer 105 may select to use either or both geographic area and/or the predetermined time period. Furthermore, the quantity of the at least one vehicle purchased may also be determined by the number of loan instruments received by the issuer 105. For example, the number of successful or approved loan instruments received by the issuer 105 from merchants may indicate successful sales of the vehicles. Therefore, the total number of approved loan instruments may also be used to determine the quantity of the at least one vehicle purchased. In addition, the quantity of the at least one vehicle purchased may also be determined by monitoring the inventory of the merchants. For example, the removal of a vehicle with a specific vehicle identification number (VIN) from the inventory of the merchant may be determined as the vehicle being sold to a purchaser as long as the specific VIN does not reappear at another merchant's inventory.

At step 404 a value may be assigned to the at least one vehicle based on the quantity of the at least one vehicle purchased and a quantity of queries received. The value may be a numerical value from 0-100 or any other descriptor that may represent the desirability or demand of the vehicle. For example, the Honda Accord may have sold more than any other vehicle and have received a high number of search queries, then the Honda Accord may be assigned a value of 90 to represent a high desirability.

At step 405, the availably of at least one vehicle at the location of the merchant assigned a desirability value above or below a threshold value, or within a given range, may be monitored. The threshold value or given range may be set by the shopper or the issuer 105, based on factors such as a shopper preference, budget, timeline, or the like. The threshold value may be used to focus on vehicles having a general given desirability (reflecting, e.g., a general availability, price negotiability, price point, and the like). The availability of the vehicles may be monitored by, e.g., identifying the vehicles in merchants' inventories (e.g., the inventories of merchants 130A-130C), and subsequently evaluating loan instruments received (e.g., by the issuer 105) from those merchants. For example, any successful or approved loan instruments received by the issuer 105 from a merchant may indicate a successful sale of vehicles identified in the loan, and thereby a reduction of the availability of the vehicle. The availability of the vehicles may also be determined by monitoring the VINs of the available vehicles in the inventory of the merchant. If the VINs of the available vehicles are removed from the inventory of the merchant, it may be determined that the vehicles have been sold, as long as the VINs do not appear in another merchant's inventory.

At step 406, a likelihood value for purchasing by the shopper of an available vehicle assigned a desirability value above or below the threshold value, or within the given range of values, may be determined. A shopper may have a low likelihood value for purchasing a vehicle outside of a given range, because, e.g., the vehicle may not be priced appropriately for the financial status of the shopper, negotiability on the vehicle price may be limited, and/or the vehicle may be less desirable. For example, a shopper may be pre-approved for a certain financial amount by the issuer 105 and a vehicle with a higher-than-appropriate desirability value may exceed the pre-approved financial amount. A vehicle with a low desirability value may then be recommended to the shopper because vehicles with low desirability value may be unpopular and more difficult for a merchant to sell, but may fit the shopper's particular needs or desires. Therefore, the shopper may be able to negotiate a price that fits with the financial status of the shopper or to the benefit of the shopper. Conversely, a shopper pre-approved for a greater amount by the issuer 105 may have a low likelihood for purchasing a vehicle with a lower-than-appropriate desirability score, because such a shopper may wish, and be able, to purchase a more popular vehicle. The likelihood value be determined by, e.g., the issuer 105, based on the preferences of the shopper and/or the financial status of the shopper. The preferences of the shopper may be set by the shopper to indicate vehicle preferences (e.g., year, make, model, color, type, transmission, door count, condition), the financial status of the shopper may be credit profile (e.g., credit score, debt amount, credit segmentation) or any pre-approved loan amount from the issuer 105. For example, if the shopper indicates a preference for sedans and a vehicle with a desirability value within a preferred range is a sports car, the likelihood value of the shopper purchasing the sports car may be low. Conversely, if the vehicle having a desirability value within a preferred range is a sedan, and the cost of the vehicle is within a pre-approved loan amount issued by the issuer 105, the likelihood value of the shopper purchasing the sedan may be high.

At step 407, based on the likelihood value, an available vehicle with a suitable desirability value (e.g., above or below a threshold value, or within a given range) may be transmitted to the shopper as a recommendation. The recommendation may be transmitted to the shopper via a website or via an application (e.g., notification) on the device operated by the shopper (e.g., a user device 140).

The above embodiments of the disclosure have been described with respect to assisting users in purchasing vehicles. However, other embodiments of the disclosure may assist the merchants in managing inventory of vehicles to maximize benefits for the merchants. Merchants may utilize the assigned desirability value of vehicles for better inventory management. For example, if a vehicle is determined to have a high desirability value, the merchants may attempt to acquire more of the vehicle to fulfil inventory requirements. Conversely, if a vehicle is determined to have a low desirability value, the merchants may attempt to reduce the number of vehicles in inventory to add vehicles with higher desirability value. The merchants may reduce inventory by offering a lower price to purchasers or performing trades with other merchants. Furthermore, the desirability of vehicles may be monitored by predetermined time periods. Therefore, merchants may be able to adjust inventory prior to the occurrence of those time periods. For example, a convertible vehicle may have a higher desirability value during time periods with warm weather, a merchant may be able to acquire more convertible vehicles for inventory before the occurrence of a time period with warm weather.

Figure 5:
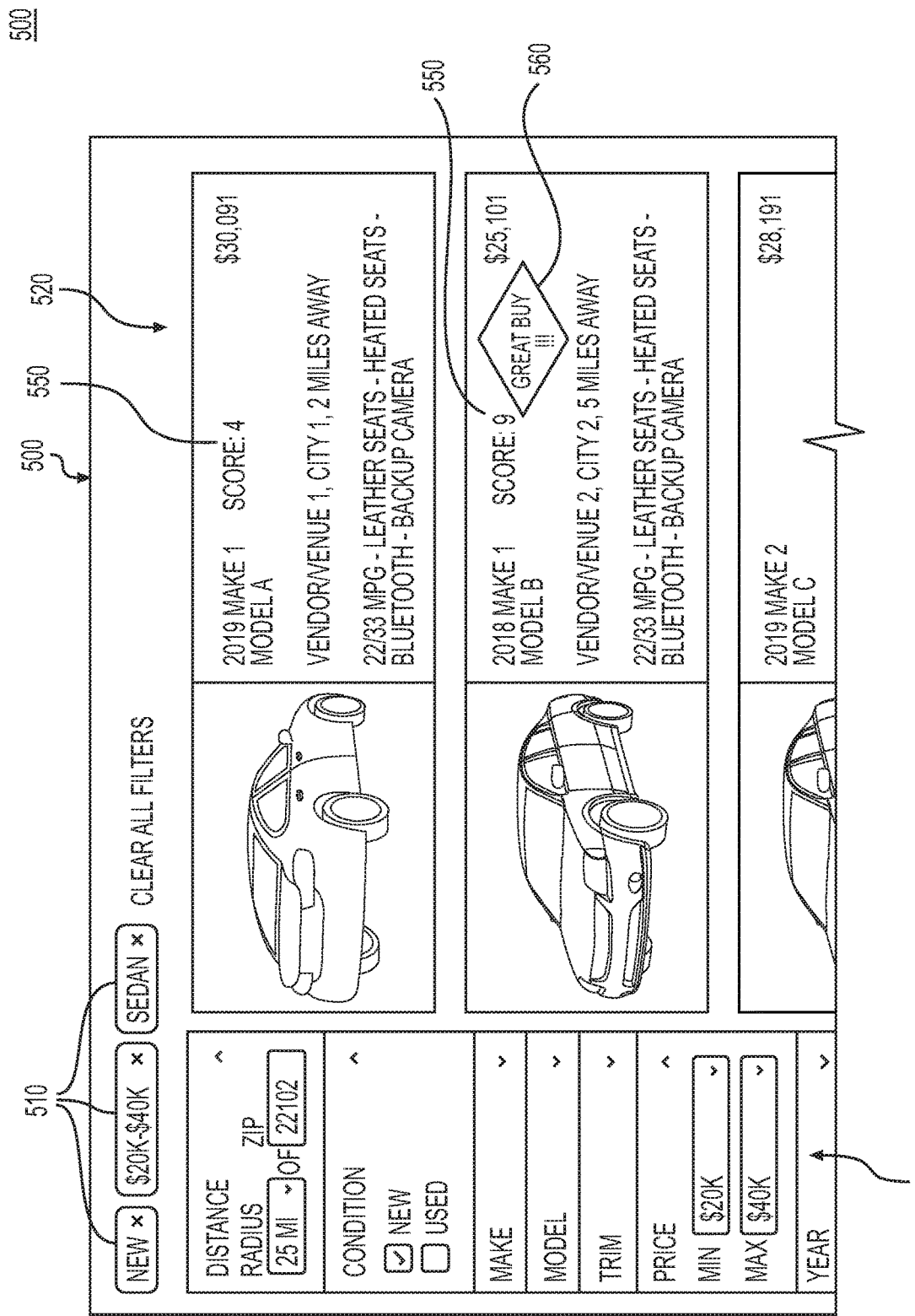
FIG. 5 depicts an exemplary user interface for a user for vehicle recommendation based on desirability value, according to one or more embodiments.

FIG. 5 depicts an exemplary user interface 500 for vehicle recommendations based on desirability score, according to one or more embodiments. The user interface 500 may be executed on user devices 140, such as smartphones, wearable computing devices, tablet computers, laptops, or desktop computers, and may be implemented via a web browser, an application, a chat bot, or other software having a display component. A user may access the user interface 500 on a user device 140 at a location that is remote from the merchant. For example, a user may be at home or a coffee shop while researching a vehicle to purchase. A user may also access the user interface 500 at a merchant location. For example, a user may be at a vehicle dealership making a purchase of a vehicle, using the user interface 500.

The user interface 500 may include display of purchase requirements 510, a vehicle recommendation screen 520, a purchase requirement input section 540, a vehicle desirability value 550, and a recommendation interface 560. The user may select their purchase requirements of the vehicle in input section 540. For example, the purchaser may research new sedans within the price range of $20,000 to $40,000, as indicated by the purchase requirements 510. The vehicle recommendation screen 520 may display a list of recommended vehicles according to the purchase requirements 510. The vehicle recommendation screen 520 may also display information regarding a listed vehicle, such as a location of a merchant that has the vehicle available, and features of the vehicle (e.g. fuel mileage, heated seats, backup camera). The vehicle recommendation screen 520 may also display the price of the vehicle. The vehicle recommendation screen 520 may display all vehicles that fit the purchase requirements, or only vehicles that the user can acquire as determined by the issuer 105 by comparing to the purchaser credit profile.

The vehicle desirability value 550 may correspond to the desirability score of each vehicle. For example, as shown in the user interface 500, Model A has a desirability score of 4 and Model B has a desirability score of 9, indicating to the user that Model B may be a more popular vehicle, with a less negotiable price, than Model A. Model B may further have a recommendation interface 560 displaying to the user a recommendation for the vehicle. For example, based on the desirability value 550 and the preference and financial status of the user, Model B may be identified as a great buy for the user. The recommendation interface 560 may include, or may be capable of using, a plurality of different display formats. For example, the recommendation interface 560 may display a recommendation using text (e.g. "Great Buy"), or may display a recommendation with color coding (e.g. green highlighting for a great buy and red highlighting for a non-recommended buy).

The user interface 500 may also be displayed to merchants (e.g., the merchants 130A-130C) to assist the merchants with inventory management. The interface 500 may display to a merchant a list of vehicles in its inventory and the associated desirability value of each vehicle. The recommendation interface 560 may recommend to the merchant actions to adjust and balance inventory to maximize benefits (e.g. acquire vehicles with high desirability score and reduce vehicles with low desirability score).

Figure 6:
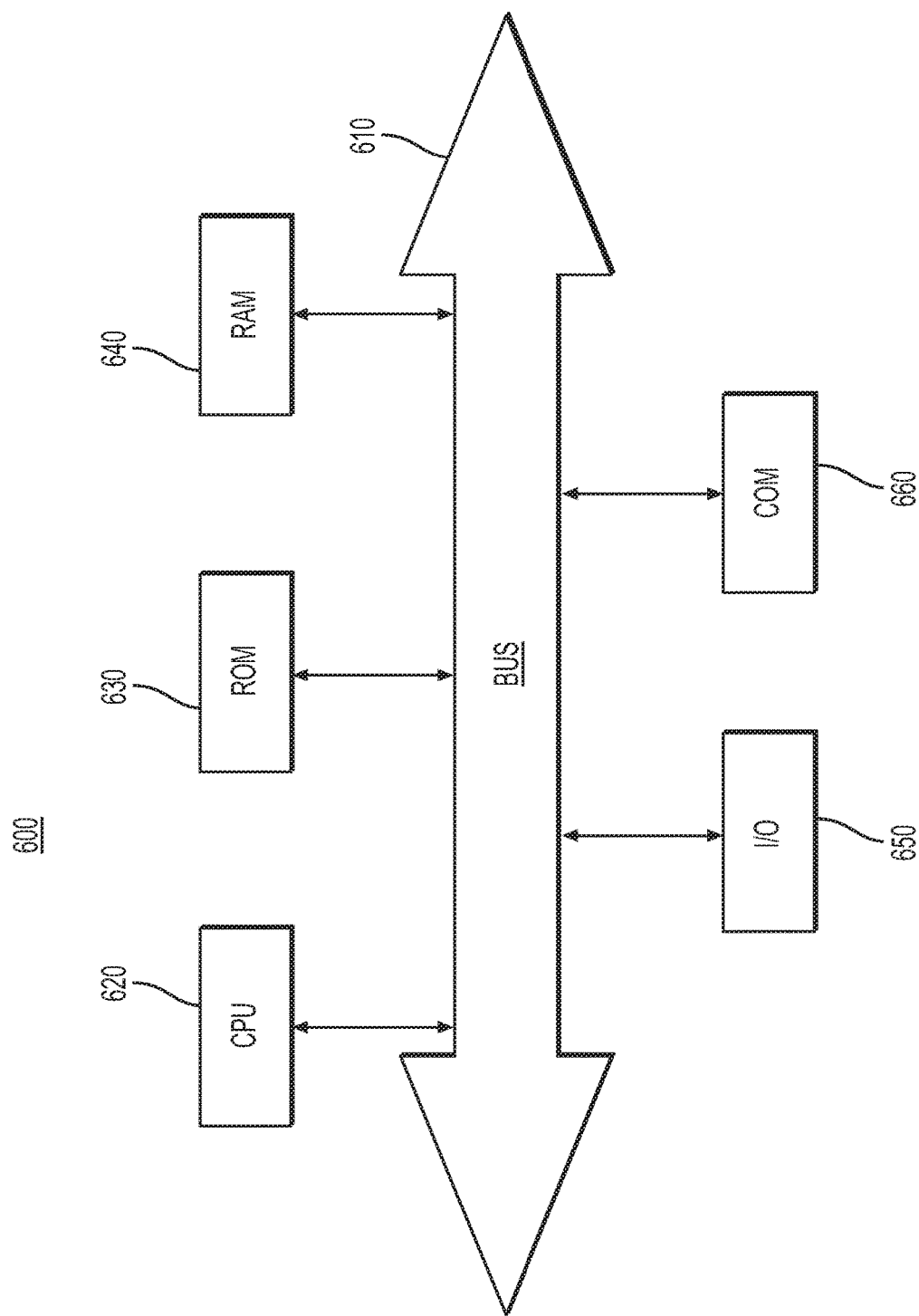
FIG. 6 depicts an exemplary computer device or system, in which embodiments of the present disclosure, or portions thereof, may be implemented

FIG. 6 depicts a high-level functional block diagram of an exemplary computer device or system, in which embodiments of the present disclosure, or portions thereof, may be implemented, e.g., as computer-readable code. Additionally, each of the exemplary computer servers, databases, user interfaces, modules, and methods described above with respect to FIGS. 1-5 can be implemented in device 600 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-5.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-5, may be implemented using the device 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 6, the device 600 may include a central processing unit (CPU) 620. the CPU 620 may be any type of processor device including, for example, any type of special purpose or a general-purpose microprocessor device. As will be appreciated by persons skilled in the relevant art, the CPU 620 also may be a single processor in a multi-core/multiprocessor system, such system operating alone, or in a cluster of computing devices operating in a cluster or server farm. the CPU 620 may be connected to a data communication infrastructure 610, for example, a bus, message queue, network, or multi-core message-passing scheme.

The device 600 also may include a main memory 640, for example, random access memory (RAM), and also may include a secondary memory 630. The secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, the secondary memory 630 may include other similar means for allowing computer programs or other instructions to be loaded into the device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to the device 600.

The device 600 also may include a communications interface ("COM") 660. The communications interface 660 allows software and data to be transferred between the device 600 and external devices. The communications interface 660 may include a modem, a network interface (such as an Ethernet card), a communications port, a PCMCIA slot and card, or the like. Software and data transferred via communications interface 660 may be in the form of signals, which may be electronic, electromagnetic, optical, or other signals capable of being received by the communications interface 660. These signals may be provided to the communications interface 660 via a communications path of the device 600, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. The device 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for regulating vehicle stock, the method comprising:
 receiving, by one or more processors, via a graphical user interface associated with a user, a query indicative of one or more characteristics of one or more purchasable vehicles at a location of a merchant;

receiving, by the one or more processors, queries data including one or more queries indicative of one or more characteristics of the one or more purchasable vehicles received from additional users;

receiving, by the one or more processors from a merchant database, transaction data including a quantity of the one or more purchasable vehicles that were purchased or attempted to be purchased by the additional users, wherein the transaction data is obtained from a database of an issuer, wherein the issuer is a financial service entity;

assigning, by the one or more processors, using at least one trained machine learning model, a desirability value to each of the one or more purchasable vehicles based on the at least one trained machine learning model learning relationships between the transaction data, the queries data, and the one or more characteristics of the one or more purchasable vehicles;

determining, by the one or more processors, an availability at the location of the merchant for each of the one or more purchasable vehicles assigned a desirability value;

assigning, by the one or more processors, a likelihood value for each of the one or more available vehicles assigned a desirability value, wherein the likelihood value is a likelihood that the user purchases each of the one or more available vehicles assigned a desirability value and is based on one or more of a user preference set by the user or a user financial status and the desirability value in comparison to a threshold desirability value, the threshold desirability value determined by the issuer or the user;

transmitting, by the one or more processors, to the user, for display via the graphical user interface, a recommendation to purchase an available vehicle assigned a highest likelihood value and a desirability value below the threshold desirability value;

receiving, by the one or more processors, additional transaction data from a purchaser info database, the additional transaction data including whether the user purchased or failed to purchase the recommended available vehicle; and transmitting to the user, by the one or more processors, a second recommendation to purchase a second available vehicle, the second recommendation dynamically determined based on the at least one trained machine learning model assigning an updated desirability value for the second recommendation based on the additional transaction data.

2. The computer-implemented method of claim 1, wherein the user preference includes data indicating vehicle preferences, including at least one of a vehicle year, a vehicle make, a vehicle model, a vehicle color, a vehicle type, a vehicle transmission, a vehicle door count, or a vehicle condition.

3. The computer-implemented method of claim 1, wherein the user financial status includes data indicating a credit profile, including at least one of a credit score, a debt amount, a credit segmentation, or a pre-approved loan amount.

4. The computer-implemented method of claim 1, wherein the transaction data including the quantity of the one or more purchasable vehicles that were purchased or attempted to be purchased by the additional users comprises vehicles within a predetermined distance of the location of the merchant or within a predetermined time period.

5. The computer-implemented method of claim 1, wherein the transaction data includes data indicating one or more loan instruments associated with the quantity of the one or more purchasable vehicles that were purchased or attempted to be purchased by the additional users.

6. The computer-implemented method of claim 1, wherein the transaction data includes data indicating an available inventory of merchants in a predetermined area associated with the quantity of the one or more purchasable vehicles that were purchased or attempted to be purchased by the additional users.

7. The computer-implemented method of claim 1, wherein assigning the desirability value to each of the one or more purchasable vehicles further includes assigning the desirability value based on a number of the one or more purchasable vehicles purchased in a predetermined historical period.

8. The computer-implemented method of claim 1, wherein assigning the desirability value to each of the one or more purchasable vehicles further includes the trained machine learning model learning relationships between demographics of the user and other information of the user.

9. The computer-implemented method of claim 1, wherein the one or more characteristics of the vehicle includes at least one of a make, a model, a mileage, a total price, a monthly payment, a vehicle category, a body style, a year, a condition, a feature, a fuel economy, a drive type, a specification, a zip code, or a selected one or more merchants of a plurality of merchants.

10. The computer-implemented method of claim 1, further comprising:
causing display, via the graphical user interface, of one or more of:
a graphical depiction of the available vehicle assigned the highest likelihood value and the desirability value below the threshold desirability value;
one or more purchase requirements associated with the available vehicle;
the desirability value for the available vehicle;
a purchase requirement input section; or
a vehicle recommendation comprising one or more other vehicle purchase recommendations.

11. A computer-implemented method for regulating vehicle stock, the method comprising:
receiving, by one or more processors, via a graphical user interface associated with a user, a query indicative of one or more characteristics of one or more purchasable vehicles at a location of a merchant;
receiving, by the one or more processors, queries data including one or more queries indicative of one or more characteristics of the one or more purchasable vehicles received from additional users;
receiving, by the one or more processors from a merchant database, transaction data including a quantity of the one or more purchasable vehicles that were purchased or attempted to be purchased by the additional users, wherein the transaction data is obtained from a database of an issuer, wherein the issuer is a financial service entity;
assigning, by the one or more processors, using at least one trained machine learning model, a desirability value to each of the one or more purchasable vehicles based on the at least one trained machine learning model learning relationships between the transaction data, the queries data, and the one or more characteristics of the one or more purchasable vehicles;

determining, by the one or more processors, an availability at the location of the merchant for each of the one or more purchasable vehicles assigned a desirability value;

assigning, by the one or more processors, a likelihood value for each of the one or more available vehicles assigned a desirability value, wherein the likelihood value is a likelihood that the user purchases each of the one or more available vehicles assigned a desirability value and is based on a user preference set by the user;

transmitting, by the one or more processors, to the user, for display via the graphical user interface, an identified recommendation to purchase an available vehicle assigned a highest likelihood value and a desirability value below a threshold desirability value;

receiving, by the one or more processors, additional transaction data from a purchaser info database, the additional transaction data including whether the user purchased or failed to purchase the recommended available vehicle: and transmitting to the user, by the one or more processors, a second recommendation to purchase a second available vehicle, the second recommendation dynamically determined based on the at least one trained machine learning model assigning an updated desirability value for the second recommendation based on the additional transaction data.

12. The computer-implemented method of claim 11, wherein the likelihood value is further assigned based on a user financial status associated with the user and the user financial status includes data indicating a credit profile, including at least one of a credit score, a debt amount, a credit segmentation, or a pre-approved loan amount.

13. The computer-implemented method of claim 11, wherein the transaction data including the quantity of the one or more purchasable vehicles that were purchased or attempted to be purchased by the additional users comprises vehicles within a predetermined distance of the location of the merchant or within a predetermined time period.

14. The computer-implemented method of claim 11, wherein the transaction data includes data indicating one or more loan instruments associated with the quantity of the one or more purchasable vehicles that were purchased or attempted to be purchased by the additional users.

15. The computer-implemented method of claim 11, wherein the transaction data includes data indicating an available inventory of merchants in a predetermined area associated with the quantity of the one or more purchasable vehicles that were purchased or attempted to be purchased by the additional users.

16. The computer-implemented method of claim 11, wherein assigning the desirability value to each of the one or more purchasable vehicles further includes assigning the desirability value based on a number of the one or more purchasable vehicles purchased in a predetermined historical period.

17. The computer-implemented method of claim 11, wherein assigning the desirability value to each of the one or more purchasable vehicles further includes the trained machine learning model learning relationships between demographics of the user and other information of the user.

18. The computer-implemented method of claim 11, wherein the one or more characteristics of the vehicle includes at least one of a make, a model, a mileage, a total price, a monthly payment, a vehicle category, a body style, a year, a condition, a feature, a fuel economy, a drive type, a specification, a zip code, or a selected one or more merchants of a plurality of merchants.

19. The computer-implemented method of claim 11, further comprising:

causing display, via the graphical user interface, of one or more of:
 a graphical depiction of the available vehicle assigned the highest likelihood value and the desirability value below the threshold desirability value;
 one or more purchase requirements associated with the available vehicle;
 the desirability value for the available vehicle;
 a purchase requirement input section; or
 a vehicle recommendation comprising one or more other vehicle purchase recommendations.

20. A system for regulating vehicle stock, the system comprising:

a memory having processor-readable instructions stored therein; and at least one processor configured to access the memory and execute the processor-readable instructions, which when executed by the at least one processor configures the at least one processor to perform a plurality of functions, including functions for:
 receiving, via a graphical user interface associated with a user, a query indicative of one or more characteristics of one or more purchasable vehicles at a location of a merchant;
 receiving queries data including one or more queries indicative of one or more characteristics of the one or more purchasable vehicles received from additional users;
 receiving from a merchant database transaction data including a quantity of the one or more purchasable vehicles that were purchased or attempted to be purchased by the additional users, wherein the transaction data is obtained from a database of an issuer, wherein the issuer is a financial service entity;
 assigning, using at least one trained machine learning model, a desirability value to each of the one or more purchasable vehicles based on the at least one trained machine learning model learning relationships between the transaction data, the queries data, and the one or more characteristics of the one or more purchasable vehicles;
 determining an availability at the location of the merchant for each of the one or more purchasable vehicles assigned a desirability value;
 assigning a likelihood value for each of the one or more available vehicles assigned a desirability value, wherein the likelihood value is a likelihood that the user purchases each of the one or more available vehicles assigned a desirability value and is based on one or more of a user preference set by the user or a user financial status and the desirability value in comparison to a threshold desirability value, the threshold desirability value determined by the issuer or the user;
 transmitting to the user, for display via the graphical user interface, a recommendation to purchase an available vehicle assigned a highest likelihood value and a desirability value below the threshold desirability value;
 receiving additional transaction data from a purchaser info database, the additional transaction data including whether the user purchased or failed to purchase the recommended available vehicle; and transmitting to the user, by the one or more processors, a second recommendation to purchase a second available vehicle, the second recommendation dynamically determined based on the at least one trained machine learning model assigning an updated desirability value for the second recommendation based on the additional transaction data.

* * * * *